Oct. 15, 1946.  P. LANDRUM  2,409,438
AIRCRAFT PROPELLER
Filed April 28, 1942
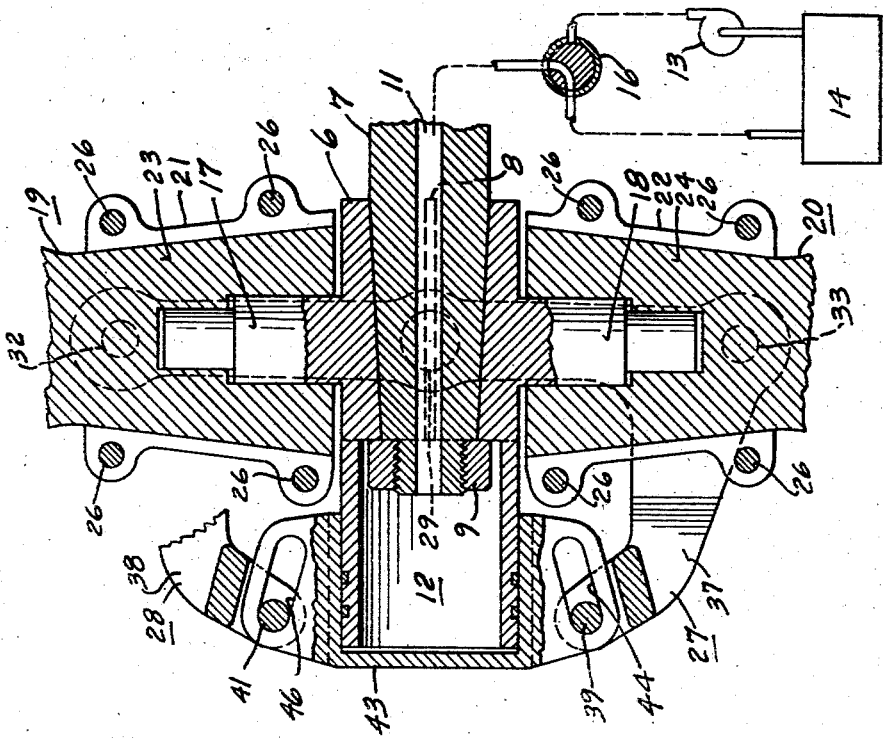
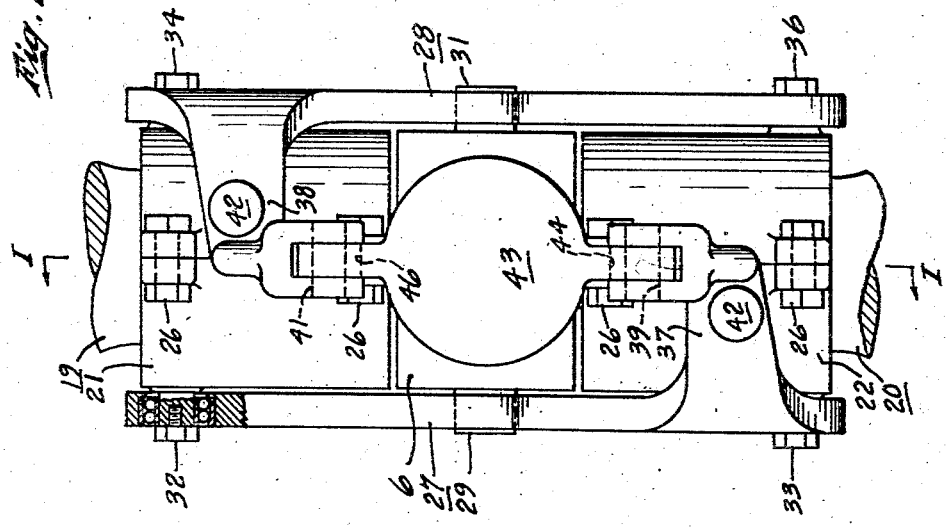
INVENTOR
*Porter Landrum*
BY
*Charles H. Bassett*
ATTORNEY Patented Oct. 15, 1946

2,409,438

UNITED STATES PATENT OFFICE 2,409,438

AIRCRAFT PROPELLER

Porter Landrum, Birmingham, Ala.

Application April 28, 1942, Serial No. 440,763

6 Claims. (Cl. 170—160)

My invention relates to aircraft propellers and has for an object the provision of a propeller in which the pitch of the blades may be adjusted to suit the operator.

My invention further contemplates the provision of pitch control means in which the torque applied to turn the blades to increase the pitch of the blades is produced by the centrifugal force of the blades when same are revolved, or stated reversely the centrifugal force of the blades acts to increase the pitch of the blades.

My invention further contemplates the provision of manually operated control means by which the pitch of the propeller blades may be decreased.

My invention embodies other novel features, details of construction and arrangement of parts which are hereinafter set forth in the specification and claims and illustrated in the accompanying drawing, forming part thereof, wherein:

Fig. 1 is a sectional view taken along the line I—I of Fig. 2 showing my improved aircraft propeller; and Fig. 2 is a front elevational view of the propeller.

Referring now to the drawing for a better understanding of my invention, I show an aircraft propeller comprising a body 6 which is securely mounted on a driving shaft 7 by means of keys 8 and nut 9 to be driven by any suitable source of power, not shown. An oil passageway 11 is formed in the driving shaft through which oil or other liquid may be delivered to an oil chamber 12 by means of a suitable pump 13, or which provides a passageway for the liquid from the chamber 12 to a reservoir 14 under control of a valve 16.

Radially disposed journals 17 and 18 are formed on the body 6 to receive propeller blades 19 and 20, respectively, for both axial and rotational movement thereon. Split collars 21 and 22 are secured to the hub ends 23 and 24 of the blades 19 and 20, respectively, by means of bolts 26. Control arms 27 and 28 are pivotally mounted on the body 6 at 29 and 31, respectively, and have their ends pivotally connected to the split collars: control arm 27 being connected to the collars by means of self-aligning ball bearings which permit adequate universal movement between the collars and the arms 21 and 22 at 32 and 33, respectively; and control arm 28 being connected to the collars 21 and 22 at 34 and 36, respectively. The control arms are formed with offset portions 37 and 38, respectively, which are adapted to carry pins 39 and 41, respectively. Suitable weight members 42 may be bolted to or formed on the offset portions 37 and 38.

A housing 43 is mounted on the forward end of the body 6 for axial movement thereon and is formed with slots 44 and 46, the axis of which converge rearwardly towards the driving shaft 7. The slots are provided to receive the pins 39 and 41.

In the operation of the propeller thus described, the centrifugal force exerted by the blades 19 and 20 acts to bring the points 29, 32, and 33, and the points 31, 34, and 36, into axial alignment with the axis of the blades, which is the position of maximum pitch of the blades. The weights 42 may or may not be needed to assist in overcoming the torque of the blades, depending upon the design of the propeller. This movement of the blades and control arms acts through the pins 39 and 41 and the slots 44 and 46 to move the housing 43 rearwardly in the event the valve 16 is open to permit the oil within the chamber 12 to flow through the passageway 11 to the reservoir 14; otherwise there can be no movement of parts to increase the pitch of the blades.

When a decrease in the pitch of the blades is desired, the valve 16 is closed to the reservoir and opened to permit a free passage from the pump 13 to the chamber 12 of the oil which acts to move the housing outwardly and thereby acting through the cam slots 44 and 46, pins 39 and 41, and control arms 27 and 28 to revolve the blades to the desired decrease in pitch. A pivotal movement of the control arms 27 and 28 about their pivot points 29 and 31, respectively, acts to rotate the blades 19 and 20 on their journals 17 and 18, respectively, and also to move the blades axially on the journals; said blades being moved inwardly when the housing 43 is moved outwardly, and said blades being moved outwardly when the housing 43 is moved inwardly.

While I have shown my invention in but one form it is obvious to those skilled in the art that it is not so limited but is susceptible of various changes without departing from the spirit thereof. It is understood in this art that a properly designed variable pitch propeller must provide for the centrifugal force exerted by the blades, the torque inherent in blades operated at variable pitches, and a uniformity of pitch for the several blades at all times. It will be observed that the control arms 27 and 28 accomplish these three functions and are therefore, understood to present an important advance in this art.

I claim:

1. In a variable pitch propeller, a body, radially disposed journals formed on the body, blades having their hub ends recessed to receive said journals, collars secured around the hub ends of the blades, control arms pivotally mounted on the body and having their ends pivotally connected to said collars, a housing mounted for axial movement on the forward end of the body, cam means provided on the housing for actuating each control arm, and means for moving the housing axially for changing the pitch of the blades.

2. A propeller according to claim 1 in which, the blades are held against axial or rotational movement at the desired pitch solely by the control arms.

3. In a variable pitch propeller, a body, radially extending journals on said body, blades mounted for sliding axial and rotative movement on said journals, a collar secured to the hub end of each blade, control arms pivotally mounted on the body and conected to the blades, offset portions on the control arms adapted to move said control arms about their pivotal connections to the body and control the pitch of the blades, and controlled fluid pressure means for actuating the said offset portions.

4. In a variable pitch propeller, a body, radially extending journals on said body, blades mounted for sliding axial and rotative movement on said journals, a collar secured to the hub end of each blade, control arms pivotally mounted on the body and connected to the blades, offset portions on the control arms adapted to move said control arms about their pivotal connections to the body and control the pitch of the blades, a housing mounted for axial movement on the forward end of the body and connected to the offset portions of the control arms, and controlled fluid pressure operated means for moving the housing.

5. In a variable pitch propeller, a body, radially extending journals on said body, blades mounted for sliding axial and rotative movement on said journals, a collar secured to the hub end of each blade, control arms pivotally mounted on the body and connected to the blades, offset portions on the control arms adapted to move said control arms about their pivotal connections to the body and control the pitch of the blades, a housing mounted for axial movement on the forward end of the body and connected to the offset portions of the control arms, and controlled means for applying fluid pressure to the housing to move it on the body.

6. In a variable pitch propeller, a body, radially extending journals on said body, blades mounted for sliding axial and rotative movement on said journals, a collar secured to the hub end of each blade, control arms pivotally mounted on the body and connected to the blades, a housing mounted for axial movement on the forward end of the body, offset portions on the control arms extending forwardly toward the housing, cam means on the housing adapted to coact with the offset portions of the control arms to change the pitch of the blades, and means for moving the housing axially on the body.

PORTER LANDRUM.